(12) United States Patent
Morrow et al.

(10) Patent No.: US 11,559,855 B2
(45) Date of Patent: Jan. 24, 2023

(54) SURFACE TOPOGRAPHY CONTROL (71) Applicant: Wisconsin Alumni Research Foundation, Madison, WI (US)

(72) Inventors: Justin D. Morrow, Madison, WI (US); Frank E. Pfefferkorn, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 943 days.

(21) Appl. No.: 15/458,638

(22) Filed: Mar. 14, 2017

(65) Prior Publication Data

US 2018/0264588 A1  Sep. 20, 2018

(51) Int. Cl.
| | | |
|---|---|---|
| B23K 26/354 | (2014.01) | |
| B23K 26/352 | (2014.01) | |
| B23K 26/082 | (2014.01) | |
| B23K 26/0622 | (2014.01) | |
| B23K 26/00 | (2014.01) | |
| B23K 26/08 | (2014.01) | |
| B23K 103/04 | (2006.01) | |

(52) U.S. Cl.
CPC ........ B23K 26/354 (2015.10); B23K 26/0006 (2013.01); B23K 26/0622 (2015.10); B23K 26/082 (2015.10); B23K 26/0869 (2013.01); B23K 26/3576 (2018.08); B23K 2103/04 (2018.08)

(58) Field of Classification Search
CPC ............. B23K 26/354; B23K 26/0081; B23K 26/3576
USPC ................................ 219/121.66, 162, 121.11
See application file for complete search history.

(56) References Cited

U.S. PATENT DOCUMENTS

| | | |
|---|---|---|
| 2,510,574 A | 6/1950 | Greenhalgh |
| 3,378,883 A | 4/1968 | Lappie |
| 3,408,007 A | 10/1968 | Raichle et al. |
| 4,303,603 A | 12/1981 | Torobin |
| 4,619,597 A | 10/1986 | Miller |
| 4,960,547 A | 10/1990 | Reinhard |
| 5,063,002 A | 11/1991 | Luker |
| 5,171,489 A | 12/1992 | Hirao et al. |
| 5,280,884 A | 1/1994 | Dorri |

(Continued)

OTHER PUBLICATIONS

Aquite et al., "Notes on the Micropelletization of Polyer Resins," ANTEC Conference Proceedings, Society of Plastics Engineers, 70th Annual Tech. Conference, 2:1136-1140 (2012). ISBN 9781622760831.

(Continued)

*Primary Examiner* — Dana Ross
*Assistant Examiner* — Joseph W Iskra
(74) *Attorney, Agent, or Firm* — Crawford Maunu PLLC (57) ABSTRACT

Various aspects of the present disclosure are directed toward utilizing pulsed laser light to melt and displace material along a surface. As may be consistent with one or more embodiments, material at respective regions of a surface is melted and displaced using pulsed laser light. The melting and displacement at different ones of the regions is carried out to facilitate different displacement at each region. Such an approach may be used by varying characteristics, such as fluence, of the pulsed laser light at each region. In this contexts, surfaces can be smoothed, and structures can be formed on the surface.

19 Claims, 6 Drawing Sheets

(56) References Cited

U.S. PATENT DOCUMENTS

| | | | | |
|---|---|---|---|---|
| 2004/0265646 | A1* | 12/2004 | Kavosh | G11B 5/82 428/848.1 |
| 2008/0122132 | A1 | 5/2008 | Kinoshita et al. | |
| 2011/0259860 | A1* | 10/2011 | Bass | B23K 26/40 219/121.72 |
| 2014/0202997 | A1* | 7/2014 | Vadali | B23K 26/3576 219/121.66 |

OTHER PUBLICATIONS

Aquite et al., "Micropellitization Using Rayleigh Disturbances," NSF CMMI Engineering Research and Innovation Conference, Poster, 1 pg. (Jul. 2012).

Ashgriz et al., "Temporal analysis of capillary jet breakup," J. Fluid Mech., 291:163-190 (1995).

Doufas et al., "Shear and extensional rheology of polypropylene melts: Experimental and modeling studies," J. of Rheol., 55:95(2011).

Drummer et al., "Development of a characterization approach for the sintering behavior of new thermoplastics for selective laser sintering," Physics Procedia, 5:533-542 (2010).

Funada et al., "Viscous potential flow analysis of capillary instability," International Journal of Multiphase Flow, 28:1459-1478 (Sep. 2002).

Gotsis et al., "Effect of long branches on the rheology of polypropylene," J. of Rheol., 48:895 (2004).

Kasperek et al., "Optimized Micropelletization Using Raleigh Disturbances," International Polymer Colloquium, Poster, 1 pg. (Apr. 2012).

Khan et al., "Comparison of the rheology of polymer melts in shear, and biaxial and uniaxial extensions," Rheologica Acta, 26:144-151 (Mar. 1987).

La Mantia et al., "Influence of the molecular structure on the melt strength and extensibility of polyethylenes," Polymer Engineering & Science, 25(5):279-283 (Mid-Apr. 1985).

Launhardt, "Manufacturing of micropellets using Rayleigh disturbances," M.S. Mech. Engineering Thesis, University of Wisconsin-Madison, 96 pgs. (2011); Call No. AWO L383 M377.

Launhardt et al., "Manufacturing of Micropellets Using Rayleigh Disturbances," ANTEC 2011, 14 pgs (May 1, 2011).

Via et al., "Analytical and Experimental Investigation of Thermocapillary Flow in Pulsed Laser Micropolishing," ASME J. Micro-Nano-Manuf., 2(2):021010.1-021010.8 (Jun. 2014).

Morrow et al., "Effects of Pulsed Laser Micro Polishing on Microstructure and Mechanical Properties of S7 Tool Steel," ICOMM No. 103 (2014).

Morrow et al., "Local Microstructure and Hardness Variation After Pulsed Laser Micro Melting on S7 Tool Steel," ASME JJ. Micro-Nano-Manuf., 4(3):031006.1-031006.10 (Sep. 2016).

Pfefferkom et al., "Improving surface finish in pulsed laser micro polishing using thermocapillary flow," CIRP Ann.—Manuf. Technol., 62(1):203-206 (2013).

Pfefferkom et al., "Controlling Surface Topography Using Pulsed Laser Micro Structuring," CIRP Ann Manuf. Technol., Manuscript No. 2017-E-04R1 (2017).

Sauer et al., "Surface tension and dynamic wetting on polymers using the Wihelmy method: Applications to high molecular weights and elevated temperatures." J. of Colloid and Interface Science, 144(2):527-537 (Jul. 1991).

Wang et al., "Surface prediction model for thermocapillary regime pulsed laser micro polishing of metals," J. Manuf. Process , 20(1):340-348 (2015).

* cited by examiner

SURFACE TOPOGRAPHY CONTROL

FEDERALLY-SPONSORED RESEARCH AND DEVELOPMENT

This invention was made with government support under CMMI1462295 awarded by the National Science Foundation. The government has certain rights in the invention.

FIELD

Aspects of various embodiments are directed to the control and/or formation of structures, such as for polishing and/or for the formation of desired surface topography using a pulsed laser.

BACKGROUND

Machining, forming, and otherwise manipulating surfaces has been important for a variety of applications. For instance, various applications benefit from different surface topographies (e.g., topologies, or micro-scale surface structures), such as smooth surfaces, rough surfaces, and structured surfaces. Components including metal-based materials involve such an application that benefits from the control of surface topography, to suit particular applications.

As related to the above, polishing surfaces, or generating surface structures for various components can involve expensive tooling, complex machinery, and complex processes. It can be particularly challenging to polish and reduce/remove large features such as those that may exhibit waviness along the surface (e.g., structures that are classified as waviness). It can also be challenging to generate surface structures on a very small scale. In addition, complex steps often need to be taken in order to plan and implement manufacturing processes for generating such structures. These and other matters have presented challenges to the design and manufacture of a variety of components, for a variety of applications.

SUMMARY

Various example embodiments are directed to the control of surface topography, such as for smoothing or generating structures, on surfaces having material that can be melted and solidified.

In accordance with one or more embodiments, pulsed laser light is used to melt material at a first region of a surface and to displace the melted material to a first displacement distance along the surface. Pulsed laser light is also used to melt material at a second region of the surface and to displace the melted material to a second displacement distance along the surface that is different than the first displacement distance. In this context, characteristics of pulsed laser light can be varied at respective regions to exert control over surface characteristics, such as to smooth surface characteristics, roughen the surface, or to generate defined structure on the surface.

In accordance with another embodiment, a method involves determining a series of laser characteristics for application to respective spots on a surface of a workpiece, based on a characteristic of the surface and a desired manipulation of the characteristic. Pulses of laser light are applied to respective ones of the spots using the respective characteristics for each spot, therein melting material at each of the spots and displacing the melted material via thermo-capillary flow by providing different amounts of displacement at different ones of the spots.

Another embodiment is directed to an apparatus comprising a laser, an actuator configured and arranged to provide relative movement between the laser and a workpiece, and a circuit that operates with the actuator and the laser as follows. Pulsed laser light is applied to melt material at a first region of a surface of the workpiece, and to displace the melted material to a first displacement distance along the surface. Pulsed laser light is also applied to melt material at a second region of the surface and to displace the melted material to a second displacement distance along the surface, which is different than the first displacement distance The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods involving structured surfaces, and their manufacture. In certain implementations, aspects of the present disclosure have been shown to be beneficial when used in the context of controlling and/or otherwise generating structure on surfaces via melting and solidification. Particular aspects involve the application of laser pulses under different conditions (e.g., location, intensity profile, spot size, power, duration and/or frequency) along a common surface to effect the displacement of material on the surface, and therein the formation of structures. For instance, surface topography can be controlled on metal parts or other material surfaces, such as by smoothing, adding aesthetic features, or creating functional structures. In various embodiments, a pulsed laser and micro-scale laser spot is used with discrete control of laser fluence (pulse energy density) to systematically vary local thermocapillary flow within respective melt pools generated by the pulses, which is used to create features at lengths much longer than an individual melt pool. For instance, periodic variation in laser energy can be used to cause changes to an extent of thermocapillary flow corresponding to alternating accumulation and depletion of material along the surface. While not necessarily so limited, various aspects may be appreciated through a discussion of examples using such exemplary contexts.

In connection with one or more embodiments, it has been recognized/discovered that the application of disparate pulses to a metal-based material can result in the net displacement of molten material beyond the displacement occurring during a single melting event. This can be facilitated via application of the disparate pulses in which overlapping ones of the pulses displace material from an initial melt pool beyond the outer diameter thereof. This approach can be used for enhanced polishing effects, such as to remove waviness in a solidified surface. This approach can further be controlled to generate topographical structure via the manner in which the pulses are applied. In various contexts, it has been further recognized/discovered that utilizing disparate pulses, relative to a consistent pulse frequency/power type application, can cause displacement of two, four or even ten times the size of a melt pool generated via the pulses. Such approaches can be utilized to polish and/or form structures for a variety of applications. For instance, mechanical componentry can be manufactured to provide support, power transmission, or force translation, and may include one or more components such as bearings, tools, and nozzles. Decorative or other visual characteristics can be formed on a surface, such as may pertain to images, designs, labels and/or text. Structures can be formed to damp or otherwise mitigate vibration and/or other vibrational effects. Surface friction properties can be set via structures that are formed. Further, the structures can be used for anti-counterfeiting efforts, to identify authentic products. Different types of material can be formed on a surface using approaches noted herein, such as to add properties of a different material to a component, or to utilize a higher value material such as gold on a surface. This may involve, for example, cladding of one material onto another by melting. Many embodiments involve applications for decorative objects such as jewelry, or objects for display.

Various embodiments are directed to laser surface manipulation that includes melting material in the surface to smooth the surface and/or create surface features via localized surface melting. In various contexts, this latter approach can be referred to as pulsed laser micro structuring (PLµS), which can be used to control, or set, surface topography. These features can be formed to characteristic lengths that are much larger than a melt pool diameter of melt regions on the surface. In certain implementations, each individual laser pulse locally melts material and causes a small amount of lateral displacement of melted material within the melted spot. This effect can be implemented in a manner similar to that used in the thermocapillary regime with pulsed laser micro polishing, such as that used in U.S. patent application Ser. No. 13/749,426 ("Reducing Surface Asperities"), which is fully incorporated herein by reference. For instance, the laser pulsing approach characterized therein can be used in the thermocapillary regime with disparate pulses as characterized herein. The displacement is varied between spots in a controlled way to cause a desired amount of net movement of material across the surface. This net movement of material can be effected across distances larger than the spot diameter, and such a distance can be directly related to how the local displacement inside individual spots is varied through spot-to-spot parameter control. This relationship between the variation of the displacement and the features created at distances much larger than an individual spot can be predicted by a model, and used to predetermine a scanning approach. For instance, laser fluence can be controlled to vary the amount of thermocapillary flow within each of a plurality of melt pools created by the laser on a surface, which can be used to create relatively long features. It has further been recognized/discovered that such an approach can be useful, for example, to reduce long wavelength features that would not be reduced through laser polishing without modulation.

The mechanism for moving material on a surface area can be varied to suit particular embodiments. In some embodiments, the surface is heated with each pulse, which locally melts material to generate a melt pool having a surface temperature gradient. Surface-tension driven thermocapillary flow is utilized to achieve desired surface displacement, which is followed by solidification. The extent of flow is controlled via the pulses. For instance, the fluence can be set to determine the extent of the displacement at each pulse, and to control the accumulation and depletion of material along the surface. This sets/controls characteristics of the residual surface topography, such as for smoothing the surface or for forming features on and/or in the surface.

A variety of approaches to the application of laser pulses can be implemented to suit various embodiments. In some embodiments, a 20-µm-diameter melt pool is used and structures with wavelengths in the 50-200 µm range are reduced in height and/or eliminated. Various displacement variation strategies can be employed such as sinusoids, triangle functions, ramps, and steps to create specific surface topographies. Complex geometries can be formed through use of laser modulation and control software, and can be achieved without necessarily utilizing complex scan paths. In certain implementations, a grayscale image can be used to create intricate structures through a PLµS process.

Pulsed laser heating/melting as characterized herein can be carried out in a variety of manners. In some embodiments, a melt pool is generated with a laser exhibiting sufficient fluence to create thermocapillary flow that extends beyond a spot that is irradiated with the laser. As the material cools and solidifies, the solidified portion extends with a dimension that is greater than that of the spot. Pulse fluence can be varied in a particular spot and/or from spot to spot to influence the extent of the thermocapillary flow, and form relatively large surface structures. For general information regarding surface treatments, and for specific information regarding approaches to treating surfaces, such as those involving thermocapillary flow, which may be used in connection with one or more embodiments, reference may be made to: Pfefferkorn, F. E., Duffie, N. A., Li, X., Vadali, M., and Ma, C., 2013, "Improving surface finish in pulsed laser micro polishing using thermocapillary flow," CIRP Ann.—Manuf. Technol., 62(1), pp. 203-206; Wang, Q., Morrow, J. D., Ma, C., Duffie, N. A., and Pfefferkorn, F. E., 2015, "Surface prediction model for thermocapillary regime pulsed laser micro polishing of metals," J. Manuf. Process.

20(1), pp. 340-348; Ma, C., Vadali, M., Li, X., Duffie, N. A., Pfefferkorn, F. E., 2014, "Analytical and Experimental Investigation of Thermocapillary Flow in Pulsed Laser Micropolishing," J. Micro Nano-Manuf., 2(2), pp. 021010-021010, and Morrow, J., F. E. Pfefferkorn, 2016, "Local Microstructure and Hardness Variation After Pulsed Laser Micro Melting on S7 Tool Steel," ASME Journal of Micro and Nano Manufacturing, 4(3): 031006-031006-10; all of which are fully incorporated herein by reference.

A variety of embodiments are directed toward generating and/or implementing a model to set a series of laser pulses to be applied for manipulating a surface, such as for polishing and/or creating structures on the surface. The model can be set for a particular application (e.g., a particular design), or implemented with various applications in which the model is used to provide different laser pulse applications for respective applications. In certain embodiments, a modeling approach is carried out as follows. A spot is defined on a particular surface to be manipulated, and a zero surface plane is initiated/set via the spot. A first region of interest (ROI) is defined for the surface, and spot geometry is added to topography at the first ROI. A second ROI is then defined based on the first ROI and a laser step (e.g., by a defined step distance). A mean plane (smoothing via melting) of the second ROI is calculated, and the topography of the second ROI is replaced with the mean plane. Spot geometry can then be added to the topography of the second ROI, with the smoothing effects. This process can be repeated, with again defining iterative ROIs based on a current ROI and a laser step.

Another model-based approach is carried out as followed, in accordance with one or more embodiments. A spot is defined on a surface, and a zero surface plane is set/initialzed for the spot. A ROI is defined relative to the spot, and spot geometry is added to topography of the ROI. These approaches can be carried out in a manner similar to that characterized above. The ROI is then moved by a laser step distance to set a new ROI, and spot geometry corresponding to the (to be) generated spot is added to topography for the new ROI. Subsequent ROIs can be defined at iterative laser steps, with spot geometry added to each ROI. In other embodiments, rather than adding spot geometry to the new ROI, spot geometry at the new ROI is replaced with geometry corresponding to the (to be) generated spot.

As may be consistent with one or more embodiments, material at respective regions of a surface is melted and displaced using pulsed laser light. The melting and displacement at different ones of the regions is carried out to facilitate different displacement at each region. Such an approach may be used by varying characteristics, such as fluence, power and/or duration of the pulsed laser light at each region. Iterative pulses of such laser light can be used to displace material over a portion of the surface that extends beyond a melt pool created by the pulsed laser light. As the displaced material solidifies, surface characteristics can be manipulated such as by smoothing the surface, and by generating structures via the varied displacements at the respective regions. The pulses of laser light can be applied over respective time periods spaced at intervals that are sufficient to allow the melted material to solidify between pulses. Further, laser pulses can be applied at different energies to generate different amounts of thermal energy at the respective regions, and therein control the resulting shape of the surface (e.g., for setting a structure shape).

In various implementations, the material displacement can be effected using thermocapillary forces, and can be effected while mitigating or eliminating ablation of the material. In this context, thermocapillary flow can cause a displacement of material from a relatively hot center of a melt pool to a cooler edge of the pool, using a negative surface tension gradient with respect to temperature. Material can also flow from such a cooler edge of a melt pool to a hotter center, using a positive surface tension gradient with respect to temperature. As such, flow can be positive (causing material to displace outward) or negative (causing material to retract inward) for embodiments as desired. Further, the surface tension gradient may be set, or tuned, via the chemistry of the material being melted. In this context, the chemistry may be varied for a particular workpiece altogether or in a disparate manner across a surface thereof, the latter of which may facilitate different amounts of displacement at different regions of the surface. In this context, surface chemistry can be varied along with characteristics of the laser application to achieve net displacement that is different at different regions of the surface.

The laser pulses can be applied in a variety of manners, to effect different displacement at each region. Duration, fluence, laser spot diameter, laser intensity profile, relative distance between laser spots, and other characteristics of the applied pulses can be varied. A plurality of spots may thus be irradiated with the pulsed laser light under different conditions that produce different amounts of thermal energy at the respective spots. The material may be displaced to a distance that extends beyond a spot diameter of the pulsed light, and can be effected at relatively large distances, such as an order of magnitude greater than the spot diameter. In some embodiments, laser pulses are applied to respective spots on the surface that are separated from one another at a distance, and used to displace melted material from the regions into contact with one another. In other embodiments, the respective spots overlap, and/or regions in which the material is displaced from adjacent spots overlap. Further, material within a common region can be heated and displaced to different displacements with respective application of the pulsed laser light.

Various embodiments are directed generating and/or utilizing a model to set conditions of the pulsed laser light relative to topographies respective regions. In some embodiments, a spot location is defined in a first region, a zero surface plane is set at the spot, a first region of interest (ROI) is defined for the surface and spot geometry is added to topography at the first ROI. A second ROI is defined based on the first ROI and a laser step distance, a mean plane of the second ROI is calculated and the topography of the second ROI is replaced with the mean plane. Spot geometry is then added to the topography of the second ROI.

In accordance with another embodiment, a series of laser characteristics are determined for applying to respective spots on a surface of a workpiece, based on one or more characteristics of the surface and a desired manipulation thereof. Pulses of laser light are applied to respective ones of the spots using the respective characteristics for each spot, therein melting material at each of the spots and displacing the melted material via thermocapillary flow in which different amounts of displacement are provided at different ones of the spots. This may involve, for example, applying the laser with different fluence characteristics at respective ones of the spots. For instance, laser pulses can be applied at different energies to generate different amounts of thermal energy at respective ones of the spots, and the thermal energy can be used at each spot to provide the thermocapillary flow of different amounts for respective ones of the spots. Structures can be created on the surface by varying laser fluence at adjacent ones of the spots and providing a net movement of the melted material at the respective spots that is an order of magnitude larger than a cross-section of the spots.

Figure 1:
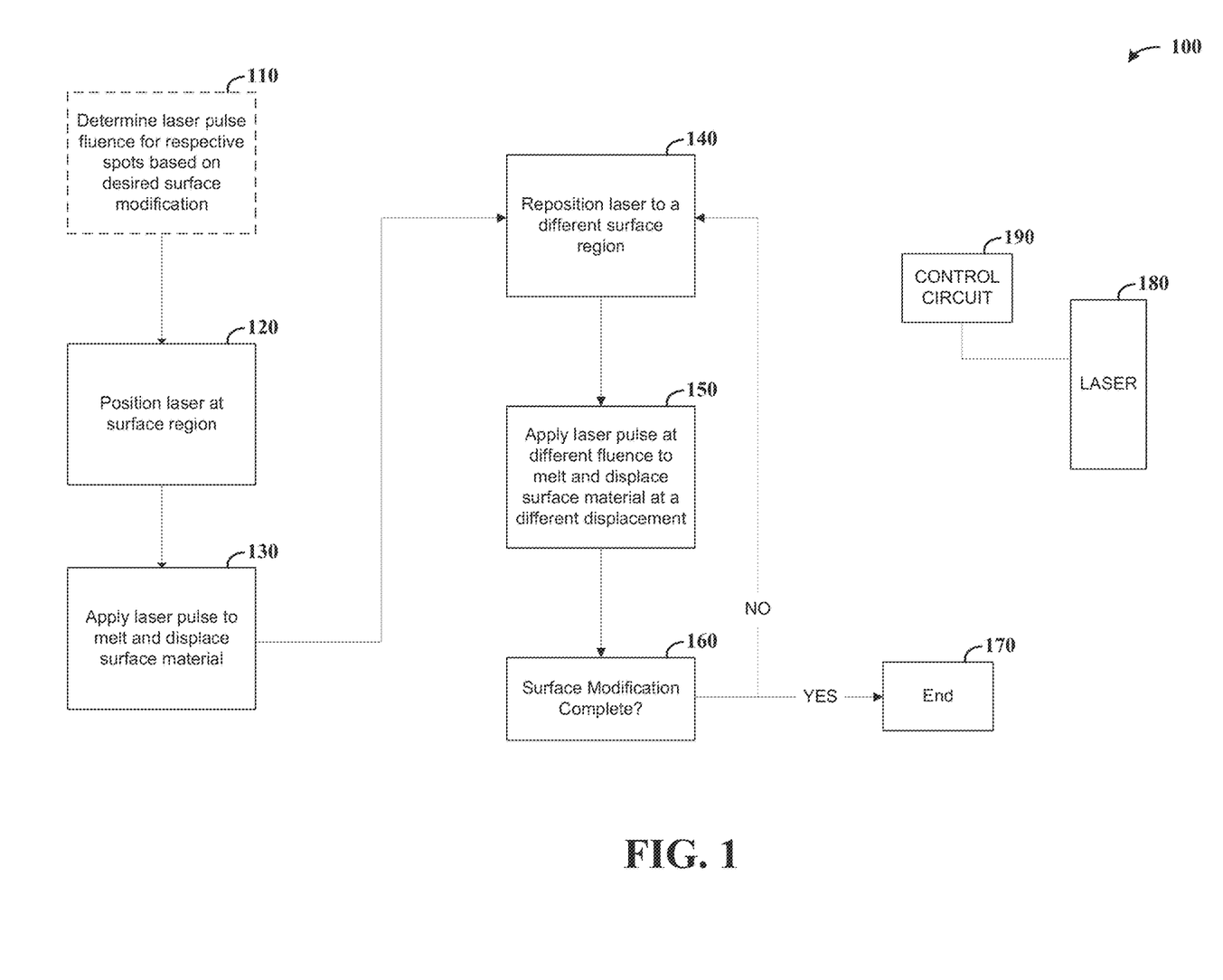
FIG. 1 shows a flow diagram for a method of constructing and/or otherwise controlling surface structures, as may be implemented in accordance with one or more embodiments.

Turning now to the figures, FIG. 1 shows a flow diagram/modules for constructing and/or otherwise controlling surface structures, as may be implemented in accordance with one or more embodiments. At block 110, laser pulse fluence is determined for respective spots based on a desired surface modification, such as to form structures and/or to smooth surface characteristics. This step may be omitted, such as where such information is provided (e.g., as an input or in a lookup table), or may be replaced with another laser parameter control-related step. At block 120, the laser is positioned at a surface region, and a laser pulse is applied at block 130 to melt material at the surface, and to displace material along the surface. This melting and displacement may, for example, involve melting material within a structure of which the surface is part of. In some implementations, this melting and displacement involves melting material placed on the surface, such as a material used to alter properties of the surface, or to decorate the surface.

At block 140, the laser is repositioned to a different surface region. This repositioning may involve, for example, setting a pitch or other distance from the first (or previous) location at which melting and displacement has been carried out. At block 150, a laser pulse is applied at a different fluence at the different surface region, and used to melt and displace surface material at a different displacement. In this context, different fluence can be used to effect displacement that varies from surface region to surface region. If surface modification is complete at block 160, the process ends at block 170. If further modification is needed, such as to complete a predefined pattern determined via modeling as characterized herein (and, e.g., as may be carried out at block 110), the process resumes at block 140 and may iteratively continue at blocks 140-160.

In some embodiments involving FIG. 1, an apparatus includes a laser 180 and a control circuit 190 configured and arranged to operate in accordance with one or more of the blocks 110-170. The laser 180 and control circuit 190 may, for example, be implemented using one or more components as shown in FIG. 1 of "Effects of Pulsed Laser Micro Polishing on Microstructure and Mechanical Properties of S7 Tool Steel," referenced above. For instance, the various modules/steps in FIG. 1 may be carried out with a logic controller implemented with circuit 190, and coupled to a laser machining apparatus 180.

Figure 2:
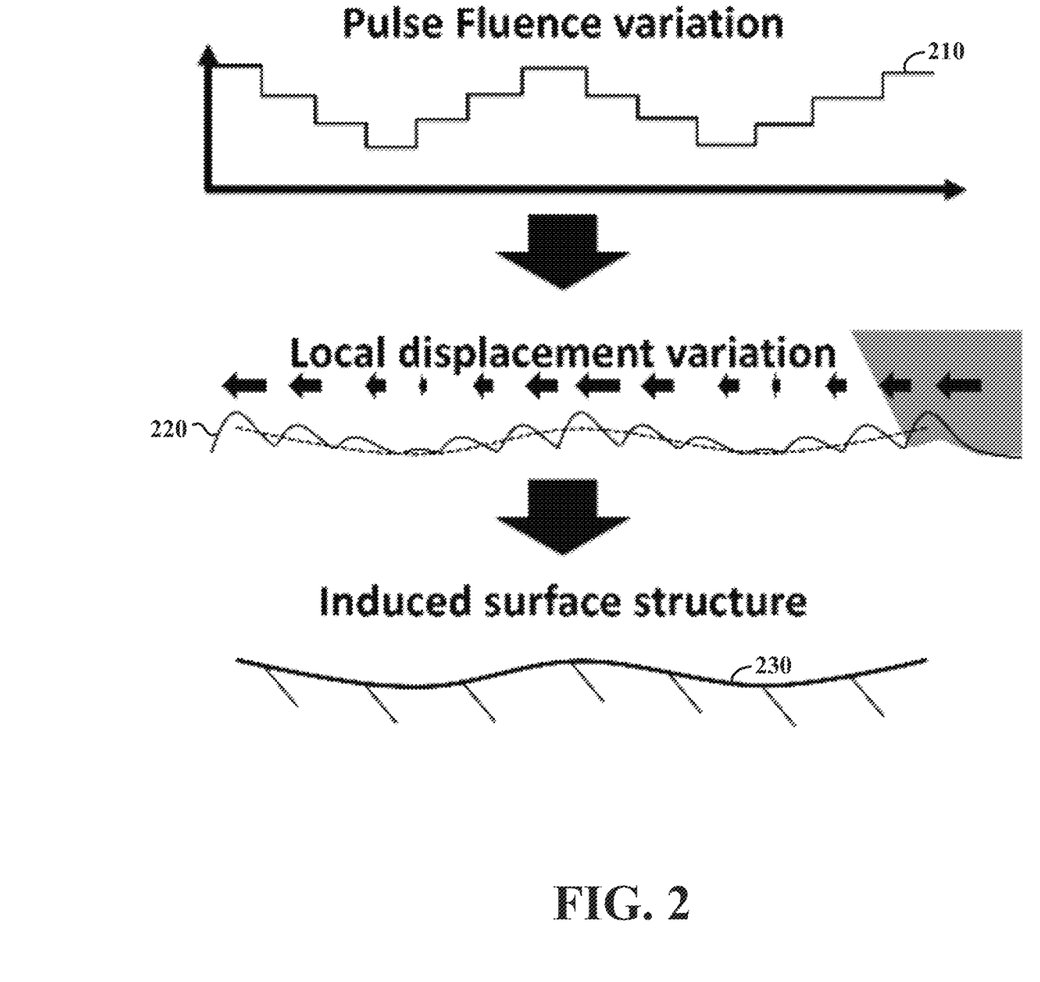
FIG. 2 shows an approach for melting using a laser spot, as may be implemented in accordance with one or more embodiments.

FIG. 2 shows an approach for melting using a laser spot, as may be implemented in accordance with one or more embodiments. During each laser pulse, the surface is heated, causing local melting and the development of a surface temperature gradient in a melt pool, and surface-tension driven thermocapillary flow is utilized to achieve desired surface displacement, which is followed by solidification. More specifically, pulse fluence is varied as shown at plot 210, which generates local displacement variation as represented in plot 220. A resulting surface structure is shown at 230, exhibiting waviness features set via the pulse fluence. This exemplary approach utilizes a sinusoidal pulse variation by way of example, but similar approaches can be implemented with other approaches such as those involving sawtooth, reverse-sawtooth, square, triangular waves. Such an approach may be implemented with a laser at a 100 µm wavelength and a 30-µm-diameter laser spot. Using this approach, a variety of structures can be formed, such as to form decorative surfaces or to functionalize a surface of a tool (e.g., a friction stir welding tool), with pulse power, spot diameter, duration, fluence, spot overlap and scan step-over set to achieve a desired result.

In certain experimental-type embodiments, a laser having 1070 nm wavelength is used with a continuous wave (200 W maximum), diode-pumped, fiber laser pulsed using external control. A scanhead is used to direct the laser across a surface, which is carried out in a vacuum chamber having reduced air pressure that can minimize oxidation during processing (e.g., P_Air=0.08 Torr).

Figure 3:
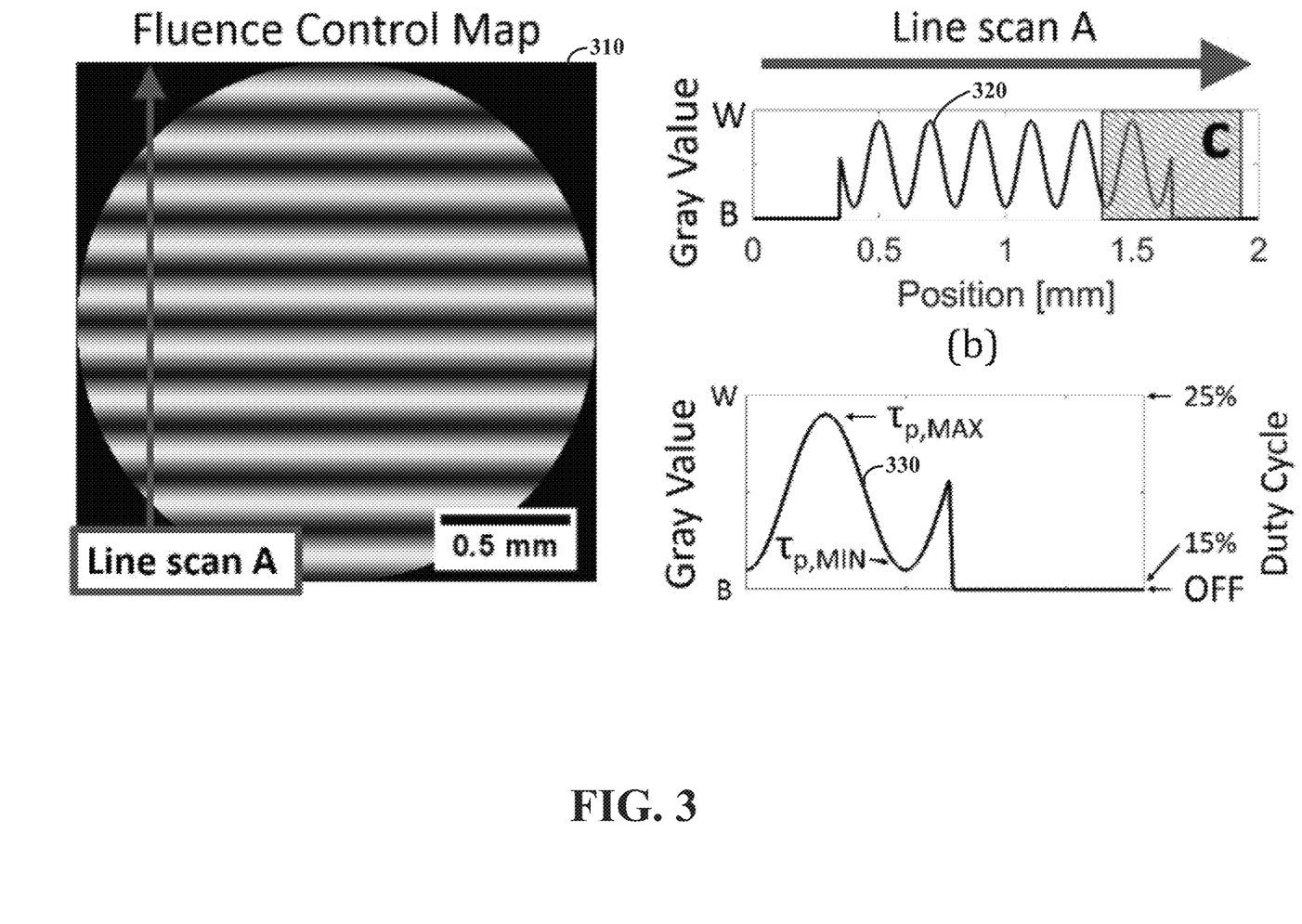
FIG. 3 shows an approach for controlling a laser, as may be implemented in accordance with one or more embodiments.

FIG. 3 shows an approach for controlling a laser, as may be implemented in accordance with one or more embodiments. What can be referred to as a fluence control map is shown at 310, for a representative line scan and direction at A. Plot 320 shows variation in a gray value which is used to set the resulting scan function relative to position as shown, with 0.5 mm increments in the plot corresponding to the legend shown in the fluence control map 310. Plot 330 shows the pulse duration ($\tau_p$) per position, corresponding to the gray value. The pulse duration can be defined for each laser spot location in the image by setting true black to define the laser as off ($\tau_p$=0 µs), one value above true black as a minimum pulse duration value ($\tau_p$=5 µs), and full white as a maximum pulse duration ($\tau_p$=15 µs). Matrices of these gray values can be created and saved as images. Accordingly, a linear scan path can be used to create a complex structure by controlling pulse duration (e.g., fluence) along each successive scan path by relating the gray values in the image (of the fluence control map) to pulse duration values. Such an approach may, for example, be utilized in connection with the approach shown and described with FIG. 1.

A variety of scan approaches can be implemented to achieve various results. In some embodiments, different types of scan approaches are used with a particular workpiece, with iterative passes being carried out using different scans. For instance, iterative melting, solidifying (or partially solidifying) and remelting can be carried out to provide additive or subtractive feature enhancement. In some implementations, multiple passes are used to increase a peak-to-valley height of surface features. A surface peak-to-valley height of features can be controlled as a function of the number of passes and wavelength of sinusoidal fluence variation, and thus the wavelength of the created surface features. In this context, it has been recognized/discovered that the height of surface features can be strongly dependent on their wavelength, such that longer wavelengths can generate higher features. The further application of additional structuring passes may cause a significant (e.g., roughly linear) increase in the structure height for longer wavelengths.

Figure 4:
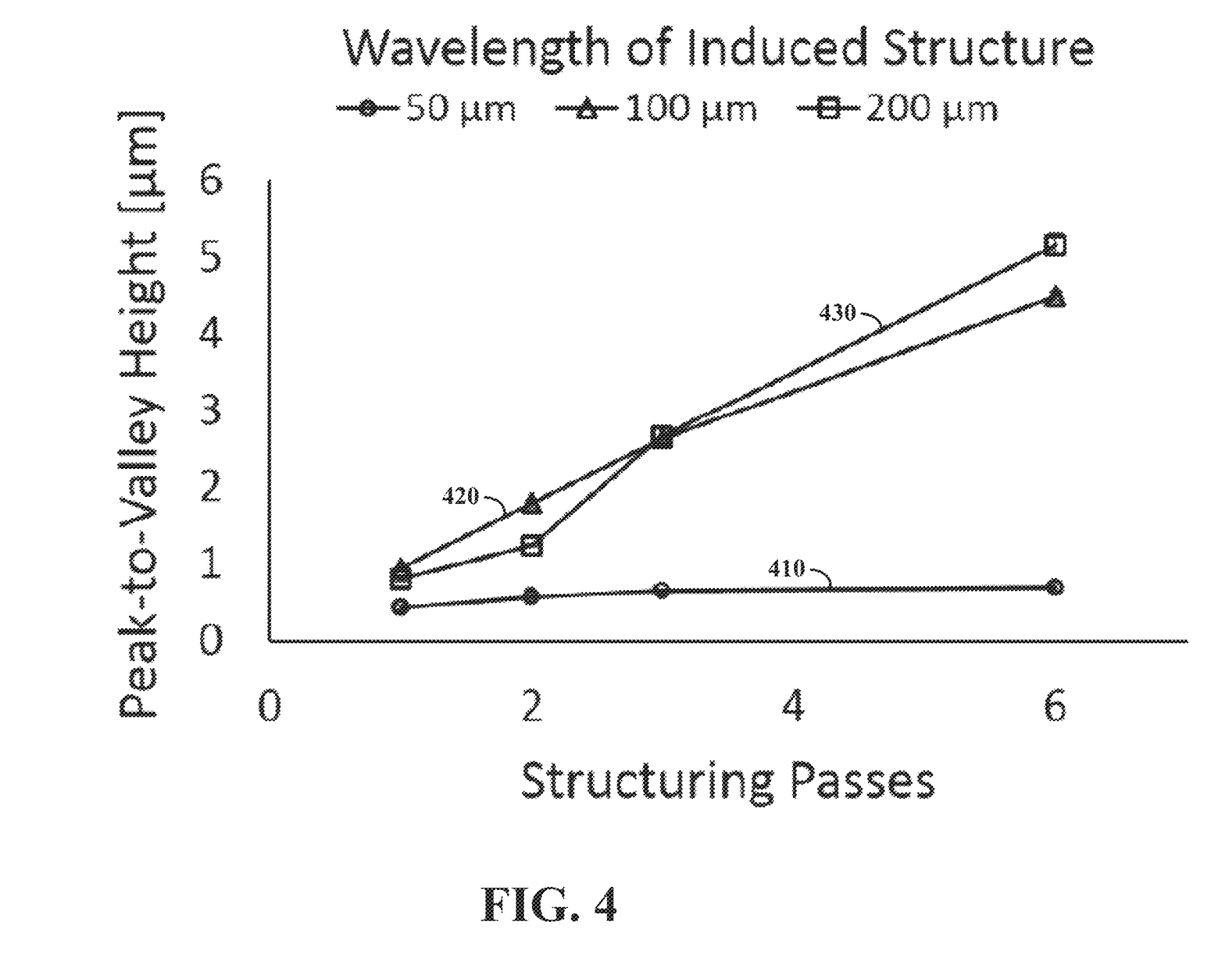
FIG. 4 shows respective plots of peak-to-valley height for respective structures, as may be implemented in accordance with one or more embodiments.

FIG. 4 shows respective plots of peak-to-valley height for respective structures, as may be implemented in accordance with one or more embodiments. Plot 410 shows resulting height for a 50 µm wavelength structure, plot 420 shows resulting height for a 100 µm wavelength structure, and plot 430 shows resulting height for a 200 µm wavelength structure. As the number of passes increases (on the horizontal legend), the height of the 100 µm and 200 µm structures continues to increase, while the height of the 50 µm structure exhibits relative modest increases.

Figure 5:
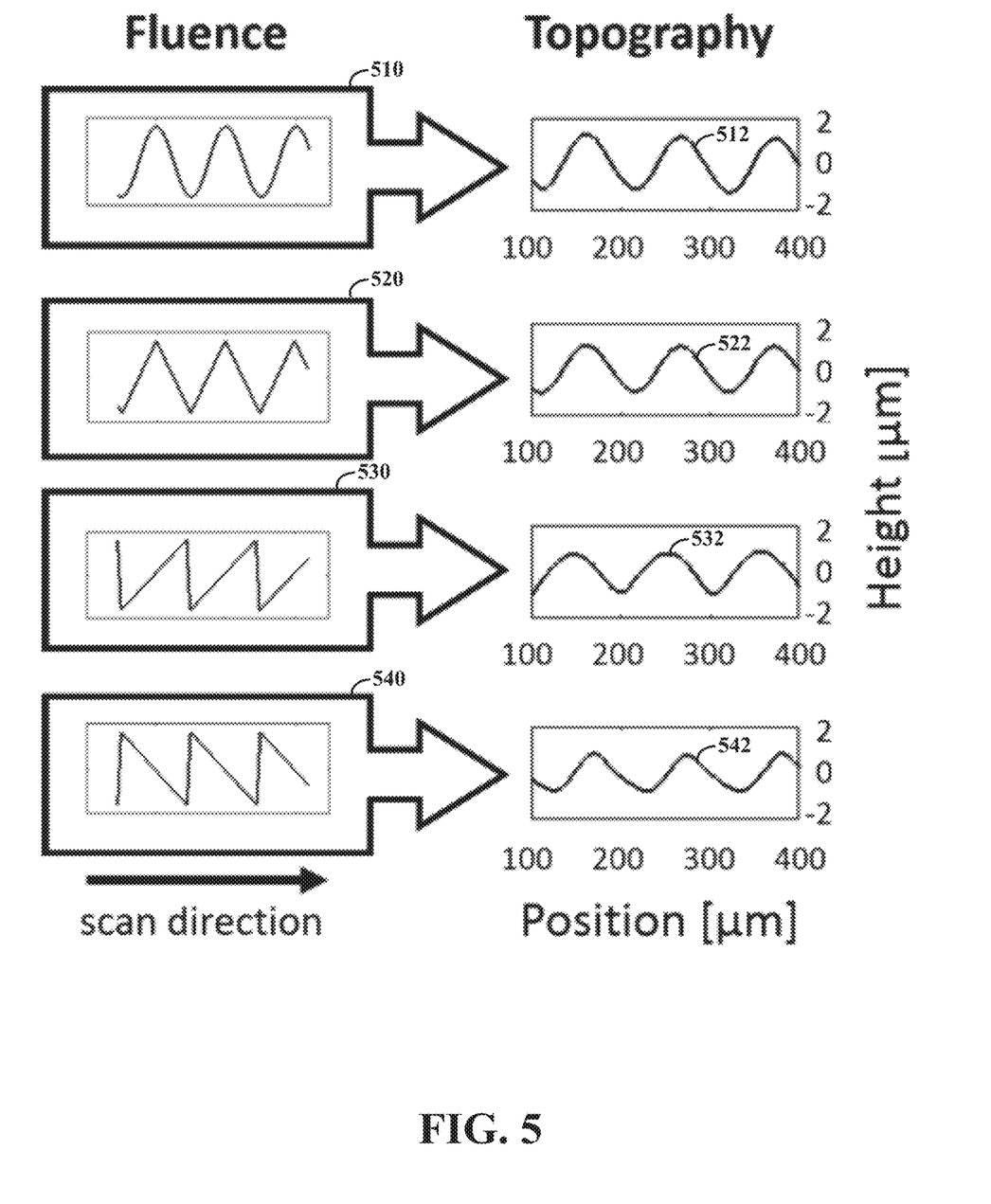
FIG. 5 shows plots for exemplary fluence modulation together with corresponding surface topography, as may be implemented in accordance with one or more embodiments.

FIG. 5 shows plots for exemplary fluence modulation together with corresponding surface topography, as may be implemented in accordance with one or more embodiments. Sinusoidal fluence modulation shown in plot 510 results in the topography shown in plot 512. Triangular fluence modulation shown in plot 520 results in the topography shown in plot 522. Sawtooth fluence modulation shown at plot 530 results in the topography shown at plot 532, and reverse-sawtooth fluence modulation at plot 540 results in the topography shown in plot 542. The surface topography can be achieved with three structuring passes, and can be averaged perpendicular to the structuring direction to give a mean surface profile as shown. As shown, sinusoidal fluence variation creates the largest surface features, followed by the triangle function, and then the "sawtooth" functions. Both the sinusoid and triangle fluence functions create surface topography that appears strongly sinusoidal, but the asymmetric "sawtooth" functions create surface topography that appears to vary significantly from an ideal sinusoid and shows significant change in the bearing area ratio.

Figure 6:
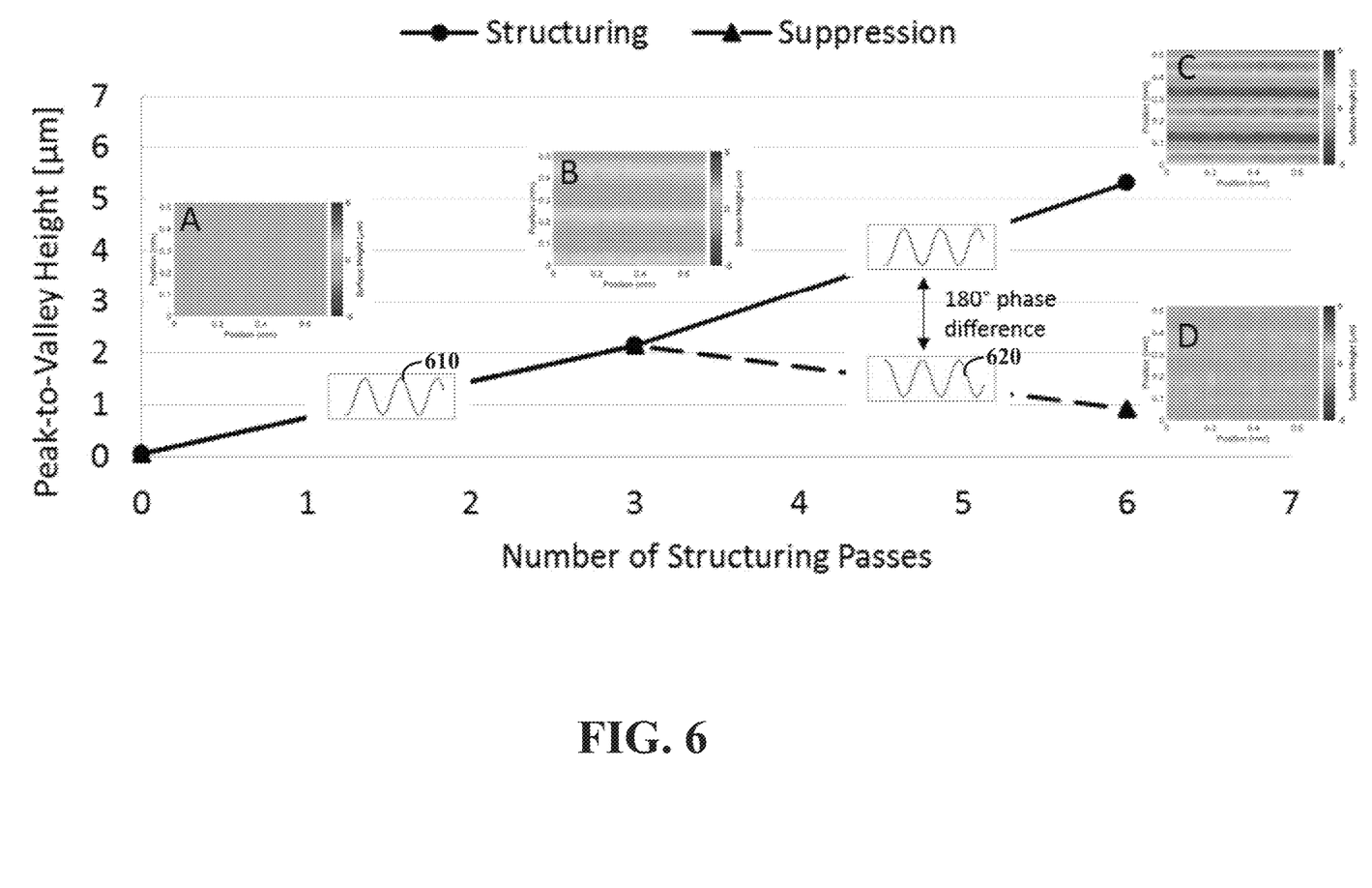
FIG. 6 shows an approach to suppression of surface features, as may be implemented in accordance with one or more embodiments.

Various embodiments are directed to suppressing or canceling unwanted surface topography. This can be carried out as part of a process in which the creation of features is mitigated, or by scanning across existing features to reduce the height thereof and/or eliminate altogether. FIG. 6 shows an approach to such suppression of surface features, as may be implemented with one or more embodiments. These approaches can be used to suppress waviness, mid-spatial-frequency error, and other feature characteristics. Various structuring passes are shown, with a first pass implemented with a sinusoid input as shown at 610, followed by a suppressive application of structuring passes using a sinusoidal input that is 180 degrees out of phase at 620. Inset plot A shows a smooth surface, B shows surface topography after three passes, and C shows surface topography after six passes using the same sinusoidal input 610. Where, after the third pass, sinusoidal input 620 is used, inset D shows the resulting surface with features that would otherwise be formed as shown in inset C being suppressed. This approach can be implemented to significantly reduce the height of long wavelength features (e.g., 200 μm using a laser spot size 30 μm).

Various embodiments employ blocks, modules or other circuits to carry out one or more of the operations and activities described herein and/or shown in the figures. In these contexts, a "block" (also sometimes "logic circuitry" or "module") is a circuit that carries out one or more of these or related operations/activities (e.g., controlling a laser scanning apparatus, determining a power or other scan characteristic based on desired surface characteristics to be achieved). For example, in certain of the above-discussed embodiments, one or more modules are implemented as discrete logic circuits or programmable logic circuits configured and arranged for implementing the operations/activities as noted herein, such as those characterized in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities, such as for controlling a laser scanning apparatus.

Based upon the above discussion and illustrations, those skilled in the art will readily recognize that various modifications and changes may be made to the various embodiments without strictly following the exemplary embodiments and applications illustrated and described herein. For example, different scanning approaches, scan line orientations, heat sources, scanning equipment and operational conditions can be implemented to suit particular embodiments. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method comprising:
applying pulsed laser light to a first region of a surface to melt material at the first region of the surface and to displace the melted material at the first region to a first displacement distance along the surface; and
applying further pulsed laser light to a second region of the surface to melt material at the second region of the surface, the second region being separated from the first region by a distance, the first and second regions being non-overlapping, and to displace the melted material at the second region to a second displacement distance along the surface that is different than the first displacement distance, therein reshaping the surface with the respective melted materials solidified at the different respective displacement distances, wherein applying the pulsed laser light to melt the material at the first region and applying the further pulsed laser light to the second region include utilizing a model to set conditions of the pulsed laser light and the further pulsed laser light respectively relative to topographies at the first and second regions, by:
defining a spot location in the first region;
setting a zero surface plane at the spot;
defining a first region of interest (ROI) for the surface;
adding spot geometry to topography at the first ROI;
defining a second ROI based on the first ROI and a laser step distance;
calculating a mean plane of the second ROI;
replacing the topography of the second ROI with the mean plane; and
adding spot geometry to the topography of the second ROI.

2. The method of claim 1, further including manipulating a characteristic of the surface by cooling the melted material after displacing the material to the first and second displacement distances, and smoothing waves of the material in the surface.

3. The method of claim 1, further including manipulating a characteristic of the surface to form a topographical structure including non-uniform variations in the surface, by displacing the material in the respective regions to the first and second displacements and, after displacing the material to the first and second displacement distances, by cooling and solidifying the material in the first and second regions to the first and second displacements to set the shape of the topographical structure.

4. The method of claim 3, wherein melting the material at the first region and melting the material at the second region respectively include applying laser pulses at different energies to generate different amounts of thermal energy at the respective regions and therein control the shape of the structure.

5. The method of claim 1, wherein
melting the material at the first region and melting the material at the second region respectively include applying laser pulses to first and second spots on the surface, the spots being separated from one another at a distance, and using the laser pulses to displace the melted material from the second region into contact with the displaced material from the first region.

6. The method of claim 1, wherein using the pulsed laser light at the first and second regions to displace the material includes displacing the material to a distance that extends beyond a spot diameter of the pulsed laser light.

7. The method of claim 1, further including varying the displacement of material in the first and second regions as well as other regions of the surface by irradiating a plurality of spots, including spots in the first and second regions, with the pulsed laser light under different conditions that produce different amounts of thermal energy at the respective spots.

8. The method of claim 1, wherein using the pulsed laser light at each region includes heating and displacing the same material at different displacements with respective application of the pulsed laser light.

9. The method of claim 1, wherein using the pulsed laser light to displace the material in the first and second regions includes using thermocapillary forces to displace the material.

10. The method of claim 1, wherein using the pulsed laser light to displace the material in the first and second regions includes using iterative pulses of the laser light to displace material over a portion of the surface that extends beyond a melt pool created by the pulsed laser light.

11. The method of claim 1, wherein using the pulsed laser light to melt the material in at least one of the first and second regions includes using pulses of laser light spaced at intervals sufficient to allow the melted material to solidify between pulses.

12. The method of claim 1, wherein using the pulsed laser light to melt material in at least one of the regions includes using different pulses of laser light at different laser power.

13. The method of claim 1, wherein using the pulsed laser light to melt material in at least one of the regions includes using pulses of laser light having different pulse durations.

14. The method of claim 1, wherein using the pulsed laser light to melt the material in at least one of the first and second regions includes melting and displacing the material while ablating about none of the material.

15. A method comprising:
determining a series of laser characteristics for applying to respective spots in first and second regions on a surface of a workpiece, the spots being separated by a distance and being non-overlapping, based on a characteristic of the surface and a desired manipulation of the characteristic, including utilizing a model to set conditions of the pulsed laser light relative to topographies at the respective spots by:
defining a spot location in the first region;
setting a zero surface plane at the spot;
defining a first region of interest (ROI) for the surface;
adding spot geometry to topography at the first ROI;
defining a second ROI in the second region based on the first ROI and a laser step distance;
calculating a mean plane of the second ROI;
replacing the topography of the second ROI with the mean plane; and
adding spot geometry to the topography of the second ROI; and
applying pulses of laser light to respective ones of the spots using the respective characteristics for each spot, therein melting material at each of the spots and displacing the melted material via thermocapillary flow, by providing different amounts of displacement at different ones of the spots, including
applying pulsed laser light to the first region of the surface to melt material at the first region of the surface and to displace the melted material at the first region to a first displacement distance along the surface; and
applying further pulsed laser light to the second region of the surface to melt material at the second region of the surface and to displace the melted material at the second region to a second displacement distance along the surface that is different than the first displacement distance, the second region being separated from the first region by a distance.

16. The method of claim 15, wherein providing the different amounts of displacement includes applying the laser with different fluence characteristics at respective ones of the spots.

17. The method of claim 15, wherein providing the different amounts of displacement includes creating structures on the surface by varying laser fluence at adjacent ones of the spots and providing a net movement of the melted material at the respective spots that is an order of magnitude larger than a cross-section of the spots.

18. The method of claim 15, wherein applying the pulses includes applying laser pulses at different energies to generate different amounts of thermal energy at respective ones of the spots and using the thermal energy at each spot to provide the thermocapillary flow of different amounts for respective ones of the spots.

19. An apparatus comprising:
a laser;
an actuator configured and arranged to provide relative movement between the laser and a workpiece; and
a circuit configured and arranged with the actuator and the laser to
apply first pulsed laser light to a first region of a surface to melt material at the first region of the surface of the workpiece, and to displace the melted material at the first region to a first displacement distance along the surface; and
apply further pulsed laser light to a second region of the surface to melt material at the second region of the surface, the second region being separated from the first region by a distance and the first and second regions not overlapping, and to displace and solidify the melted material at the second region to a second displacement distance along the surface that is different than the first displacement distance, the further pulsed laser light including pulsed laser light selected from the group of: the first pulsed laser light, pulsed laser light that is different than the first pulsed laser light, and a combination thereof, wherein applying the pulsed laser light to melt the material at the first region and applying the further pulsed laser light to the second region include utilizing a model to set conditions of the pulsed laser light and the further pulsed laser light respectively relative to topographies at the first and second regions, by:
defining a spot location in the first region;
setting a zero surface plane at the spot;
defining a first region of interest (ROI) for the surface;
adding spot geometry to topography at the first ROI;
defining a second ROI based on the first ROI and a laser step distance;
calculating a mean plane of the second ROI;

replacing the topography of the second ROI with the mean plane; and adding spot geometry to the topography of the second ROI, therein providing a shaped surface of the workpiece that includes, upon solidification, the material displaced to the first displacement distance from the first region and solidified thereat, and the material displaced to the second displacement distance from the second region and solidified thereat.

* * * * *